US008983926B2

(12) United States Patent
Cai et al.

(10) Patent No.: US 8,983,926 B2
(45) Date of Patent: Mar. 17, 2015

(54) METHOD AND SYSTEM FOR TAGGING ORIGINAL DATA GENERATED BY THINGS IN THE INTERNET OF THINGS

(71) Applicant: International Business Machines Corporation, Armonk, NY (US)

(72) Inventors: Keke Cai, Beijing (CN); Zhong Su, Beijing (CN); Xian Wu, Beijing (CN); Li Jun Xia, Beijing (CN); Jian Yao, Beijing (CN); Li Zhang, Beijing (CN); Shuo Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 13/661,628

(22) Filed: Oct. 26, 2012

(65) Prior Publication Data
US 2013/0110806 A1 May 2, 2013

(30) Foreign Application Priority Data

Oct. 31, 2011 (CN) .......................... 2011 1 0347155

(51) Int. Cl.
*G06F 17/30* (2006.01)

(52) U.S. Cl.
CPC .... *G06F 17/30864* (2013.01); *G06F 17/30946* (2013.01)
USPC ........................................................ 707/706

(58) Field of Classification Search
USPC ................... 707/722, 769, 706; 705/26.81; 455/456.2; 709/204–206
See application file for complete search history.

(56) References Cited

U.S. PATENT DOCUMENTS

| 6,910,003 | B1 | 6/2005 | Arnold et al. |
| 2008/0153509 | A1* | 6/2008 | Piekarski .................... 455/456.2 |
| 2010/0002082 | A1* | 1/2010 | Buehler et al. ................ 348/159 |
| 2010/0024042 | A1 | 1/2010 | Motahari et al. |
| 2010/0145933 | A1* | 6/2010 | Consul et al. ................. 707/722 |
| 2010/0179961 | A1* | 7/2010 | Berry et al. .................... 707/769 |
| 2011/0087559 | A1* | 4/2011 | Paul et al. ................... 705/26.81 |
| 2011/0161478 | A1 | 6/2011 | Formo et al. |

FOREIGN PATENT DOCUMENTS

| CN | 101833710 A | 9/2010 |
| EP | 2131292 A | 9/2009 |
| WO | WO 2011/001291 A | 6/2011 |

OTHER PUBLICATIONS

Bohringer and Gaedke. Ubiquitous Microblogging: A Flow-Based Front-End for Information Logistics, ILOG May 3-5, 2010, p. 4.

(Continued)

*Primary Examiner* — Etienne Leroux
(74) *Attorney, Agent, or Firm* — David J. Zwick; Jeff Tang

(57) ABSTRACT

A method and system for tagging original data generated by things in the Internet of Things (IoT). The method includes: performing relativity detection on acquired Web messages to obtain Web messages related to various events; acquiring address information contained in the related Web messages; determining adjacent things for various events based on the acquired address information; and tagging original data generated by the adjacent things determined using at least partial content of the related Web messages as metadata. The system includes modules for carrying out the above method.

9 Claims, 6 Drawing Sheets

(56) References Cited

OTHER PUBLICATIONS

Breslin, et al., Intergrating Social Networks and Sensor Networks, W3C Workshop on the Future of Social Networking, Jan. 15-16. 2009, Barcelona, p. 5.

Dong et al., "Mining Data Correlation from Multi-faceted Sensor Data in the Internet of Things," China Communications, 2011, p. 132-138, Research Paper.

Roalter et al., "A Middleware for Intelligent Environments and the Internet of Things," UIC, 2010, p. 267-281, LNCS 6406, Springer-Verlag Berlin Heidelberg.

* cited by examiner

METHOD AND SYSTEM FOR TAGGING ORIGINAL DATA GENERATED BY THINGS IN THE INTERNET OF THINGS

CROSS REFERENCE TO RELATED APPLICATION

The present invention claims priority under 35 U.S.C. 119 from Chinese Application number 201110347155.9, filed Oct. 31, 2011, the entire contents of which is incorporated herein by reference.

BACKGROUND OF THE INVENTION

1. Field of the Invention

The present invention relates to data processing techniques, and in particular, to a method and system for tagging original data generated by things in the Internet of Things (IoT).

2. Description of Related Art

The Internet of Things (i.e. IoT) has been recognized as the next significant revolution of Internet. The so-called IoT refers to providing various real-world things, such as streets, roads, buildings, water-supplying systems and household appliances with something like sensing devices, connecting them through the Internet and thereby executing specific programs, so as to achieve remote control or direct communication between these real-world things. The IoT has widened the scope of connected objects from electronics to all kinds of real-world things, that is, archiving human-machine communication and interaction, as well as the communication and interaction between objects by means of radio frequency identifications (RFIDs), sensors, binary codes and the like provided for various kinds of things through connecting to wireless networks via interfaces. For example, in the near future, household appliances, hospital devices, even a T-shirt can be connected and visited in networks just like web pages or remote servers. As a result, all the real world things can be monitored and operated through networking and their behaviors can be programmed for human convenience.

In the IoT, given a certain event, how to find sensors that have recorded information related to the event is a problem. For example, given the query "汽车追尾 (rear-end collision)", how to find cameras that have recorded such events. Such IoT search is a very important application for the IoT. Different from the World Wide Web network, construction of IoT search engines faces the following challenges:

First, the total number of things in the real world is in the order of exponent. Objects in the Internet would encode 50 to 100 trillion objects. Every human being is surrounded by 1000 to 5000 objects. The huge data scale is unaffordable for current search engines. According to statistics, the search engine of Google only indexes 1 trillion web pages in 2008.

Second, original data acquired from various things in the IoT might be in the form of image, video, audio, numerical data sequence, wavelet or the like. Substantially, no metadata is available for describing the semantics of these original data, and computers per se are unable to understand the contents of these data files. In other words, it is hard to convey human opinions and sentiments through acquired original data, and it is hard for human to understand these original data as well. Although holding plenty of original data in hand, human has found that searching related information in nature language or original data association mining, etc are difficult.

There are techniques for the deep processing of original data nowadays. However, due to the large volume of things in the IoT, such as sensors and the like, extracting semantic annotations via deep processing such as computing vision technologies is computational unaffordable. Furthermore, even with deep processing, due to the flexibility of applications, such as queries, a plenty of models are needed to be built to handle various applications, which is also impractical.

FIG. 1 is a schematic diagram showing the problems between actual applications in the prior art and original data generated by things. As shown in FIG. 1, users query sensor data in human language over a network. However, although there are huge amount of original data files available, due to the wide gap between the natural language queries by users and the original data files from the sensors, and because there is nearly no metadata available for semantic description of the original data files, it is not surprise that users can not acquire what they expected. Thus, how to associate natural language queries with original data to facilitate data search and mining as well as data association mining and the like is a technical problem in the prior art.

Therefore, there is a need in the prior art to provide a technique for tagging original data generated by things in the IoT for further data processing.

SUMMARY OF THE INVENTION

In accordance with one embodiment of the present invention, a method for tagging original data generated by things in the Internet of Things (IoT) includes the steps of: performing relativity detection on acquired Web messages to obtain Web messages related to various events; acquiring address information contained in the related Web messages; determining adjacent things for the various events based on the acquired address information; and tagging original data generated by the adjacent things determined using at least partial content of the related Web messages as metadata.

In accordance with another embodiment of the present invention a system for tagging original data generated by things in the Internet of Things (IoT) includes: a relativity detection module for performing relativity detection on acquired Web messages to obtain Web messages related to various events; an address acquisition module for acquiring address information contained in the related Web messages; an adjacency determining module for determining adjacent things for the various events based on the acquired address information; and a tagging module for tagging original data generated by the adjacent things determined using at least partial content of the related Web messages as metadata.

BRIEF DESCRIPTION OF THE DRAWINGS

The drawings referenced in the present application are only used to exemplify typical embodiments of the present invention and should not be considered to be limiting the scope of the present invention.

DETAILED DESCRIPTION OF THE PREFERRED EMBODIMENT

Figure 1:
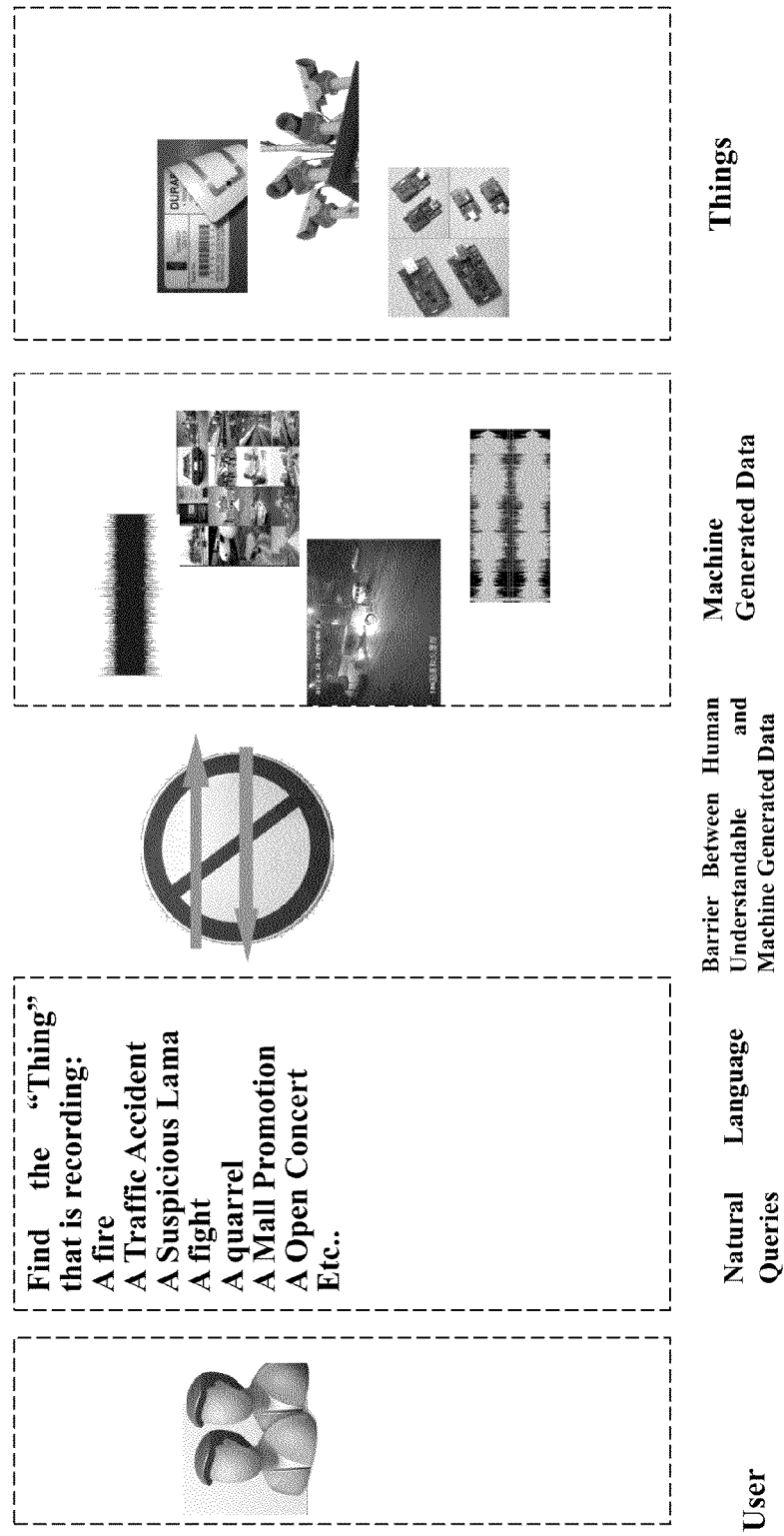
FIG. 1 is a schematic diagram showing the problem between actual applications in the prior art and original data acquired from things.

The present invention addresses at least one of above problems identified in the prior art. According to one aspect of one embodiment of the present invention, a technical scheme is provided for tagging original data through the utilization of Web messages in order to provide original data with metadata for their semantic descriptions, so as to facilitate the understanding of contents of the original data.

Web messages such as blogs and microblogs have been prevalently used in practice. The term "Web messages" used herein refers to those contents having universality and relativity and delivered over networks. The so-called "universality" means that those Web messages have a great variety of contents, involving various events, human mind, etc occurred in the real world, and posted by users over the Internet at any moment using various devices, such as mobile terminals or fixed terminals. Web messages include texts, documents, icons, photos, audios, videos, etc. The so-called "relativity" means that the contents of Web messages might be related to events that are interesting. For example, Web messages having such post times that the differences of which and the occurrence time of a concerned event is within a predetermine range of time and all about similar events can be considered as having relativity to the concerned event. Furthermore, as to the present invention, Web messages are those ones having address information provided when they are delivered by users.

The microblog is a typical example of Web messages. Microblogs are concise texts (commonly, less than 140 words), allowing users to update in time and publicly distribute in the form of blog. Common microblog services include, for example, Twitter, Yahoo, Sina, Sohu, 163, etc.

Mircoblog services are becoming flourishing recently and have attracted enormous users. According to statistics in April 2010, Twitter as a representative microblog site now has more than one million registered users and there are still 300,000 new users per day. In average, 55 million tweets, almost all-inclusive in content, are posted everyday. Among all the tweets, more than 37 percents are posted via mobile devices. Therefore, for these tweets, the locations where they are actually posted can be acquired.

Due to the prevalent use (in other words, having relativity and universality) and location aware characteristic of Web messages, it has been conceived by the inventors to enrich the semantics of sensor data with Web messages. Specifically, through identifying the relation between Web messages and sensors, and then assigning at least a part of the contents of related Web messages as tags to annotate the semantics of sensor data for bridging the huge gap between human being's understanding and original data acquired from the things, the present invention addresses the problems in the prior art. Furthermore, these semantic tags can be employed to support sensor data search and mining functions, and other applications of original data.

Embodiments of the present invention can be implemented in many manners, including as a method or a system. Several embodiments of the present invention are discussed below.

As a method for tagging original data generated by things in the Internet of Things (IoT), one embodiment of the present invention includes at least: performing relativity detection on acquired Web messages to obtain Web messages related to various events; acquiring address information contained in the related Web messages; determining adjacent things for various events based on the acquired address information; and tagging original data generated by the adjacent things determined using at least partial content of the related Web messages as metadata.

As a system for tagging original data generated by things in the Internet of Things (IoT), one embodiment of the present invention includes at least: means for performing relativity detection on acquired Web messages to obtain Web messages related to various events; means for acquiring address information contained in the related Web messages; means for determining adjacent things for various events based on the acquired address information; and means for tagging original data generated by the adjacent things determined using at least partial content of the related Web messages as metadata.

As a method for searching things in the Internet of Things, one embodiment of the present invention includes at least: inputting query items in natural language; and generating search results based on the metadata of things in the Internet of Things using the query items; wherein the metadata is generated with the above-described method.

As a device for searching things in the Internet of Things, one embodiment of the present invention includes at least: means for inputting query items in natural language; and means for generating search results based on the metadata of things in the Internet of Things using the query items; wherein the metadata is generated with the above-described device.

As a search engine on a network, one embodiment of the present invention includes at least: a module for receiving a user input; the above system; and a module for retrieving based on the user input and information generated by the device.

In the following discussion, a great amount of concrete details are provided to help thoroughly understand the present invention. However, it is apparent to those of ordinary skill in the art that even though there are no such concrete details, the understanding of the present invention would not be influenced. In addition, it should be further appreciated that any specific terms used below are only for the convenience of description, and thus the present invention should not be limited to only use in any specific applications represented and/or implied by such terms.

According to one embodiment of the present invention, through identifying relationship between Web messages and things in the IoT, and then assigning at least a part of the contents of related Web messages as tags to annotate the semantics of original data generated by the respective things, at least one problem in the prior art can be addressed. Furthermore, these semantic tags can be employed to support sensor data search and mining functions, and other applications of original data, for example, querying original data by using natural language.

Note that the term "things" used herein means any of appliances, apparatus, devices, or systems capable of generating data and transmitting these data generated to other things. For example, the things may be sensing devices, such as radio frequency identifications (RFIDs), readers, binary codes, cameras, etc, or may be stand-alone devices provided with RFIDs, readers, binary codes, cameras, etc, such as notebook computers with RFIDs, refrigerators with temperature sensors, and T-shirts with binary codes.

Figure 2:
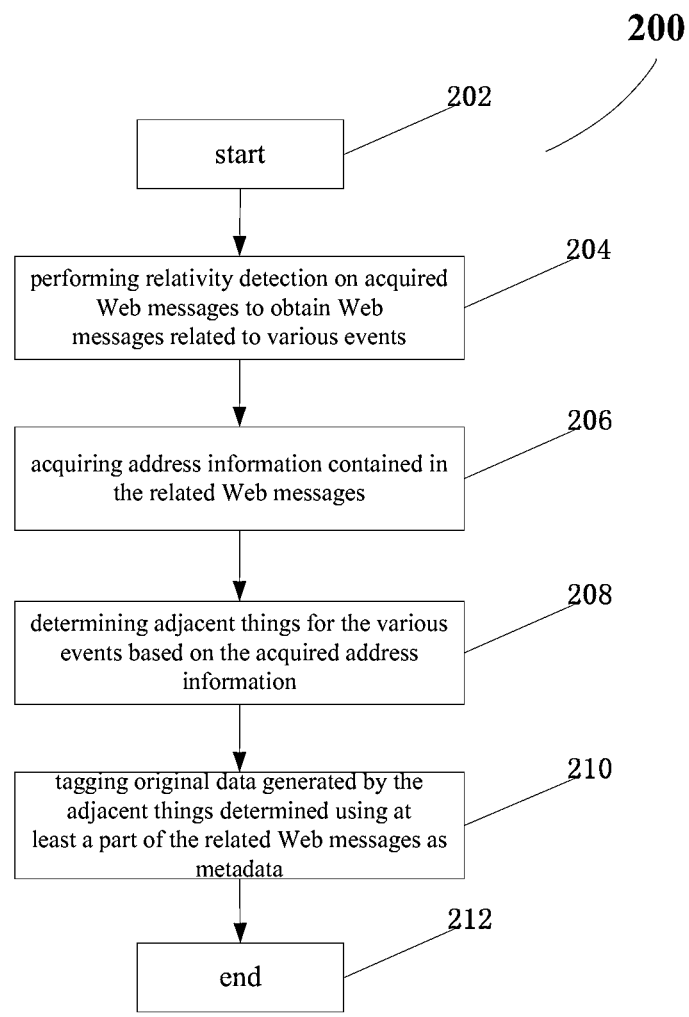
FIG. 2 is a flowchart showing a method of tagging original data generated by things in IoT according to one embodiment of the present invention.

FIG. 2 shows a process 200 of tagging original data generated by things in the IoT according to one embodiment of the present invention.

The process 200 starts at step 202.

At step 204, relativity detection is performed on received Web messages to acquire these Web messages related with events that are interesting. Step 204 can be realized through more than one filtering steps. According to one embodiment of the present invention, it may include two filtering steps:

(1) Content-Based Filtering:

Step 204 may include a content filtering step for filtering all of Web messages having related contents and discarding other messages. Because the things are to be tagged with information associated with events that are recorded by these things, the content-based filtering may be to find out items with matched contents from a plenty of Web messages according to default options (such as, lists of most frequent user query items, hotspot events, traffic accidents, or most frequently used keywords, etc). This can be implemented through reverted list techniques based on keyword match.

(2) Time-Based Filtering:

Step 204 may include a time filtering step for filtering all of time-related Web messages and discarding other messages, which may include two steps as follow:

2.1 post-time based filtering: that is, only Web messages having post times related to the occurrence times of events that are interesting are retained. The time filtering step is to filter out, from the received Web messages, those Web messages having post times within a predefined range of time from the occurrence times of the events, and discard other Web messages with inappropriate times. For example, if an interesting event is occurred at about 8:00 AM in the morning on a day, the time filtering step may only remain those Web message posted in a time period of 7:30~8:30 AM on that day.

A range of time exists due to the potential movement of users who have posted the Web messages, that is, differences between the times when they observed the event and the times when they posted the Web messages; or for a reason that the users have posted the Web messages after a period of time since they observed the event; or for differences in time due to network congestion, unstable wireless network signal, etc. The range of time may be predetermined, or may be set by users/system.

2.2 recency filtering: on the basis of post time filtering, recency filtering is further applied so that only those Web messages describing present situations and posted within a specified time interval are remained. For example, a Web message posted after 8:00 AM in the morning on that day may include content such as "XX occurring in yesterday", which is obviously not a message posted instantly and should be filtered out as out-of-time information. On the other hand, a message such as "XX occurring a moment ago" should be remained as instant information. The recency filtering step can be implemented in connection with existing word segmentation and classification techniques. According to one aspect of the present invention, a content filtering engine in which both existing word segmentation and classification techniques can be incorporated is provided. For instance, 2,000 pieces of Web messages are selected at first, which can be artificially classified into the present, the past, the future and others. Each sentence in each Web message is segmented at first. For example, after the word segmentation, a Web message containing only one sentence "我现在在看电影. (I'm watching a movie.)" is turned into "我现在在看电影. (I/am/watching/a/movie.)".

Taking each segmented word as a feature, a classifier is constructed based on machine learning algorithms, for example, the SVM (support vector machine) algorithm, the ME (maximum entropy) algorithm, etc. Thus, for those Web messages not subject to artificial tagging, they can be tagged to be one of the present, the past, the future or other categories through automatic identification implemented by the classifier. Only Web messages that are tagged as the present are remained, and other messages are removed. Note that the present invention is not limited to the process described above and other segmentation and classification techniques can be employed by those skilled in the art depending upon their actual requirements.

Although every filtering step is illustrated and described above in a specific order, it should be appreciate by those skilled in the art that the present invention is not limited to that specific order and the content-based filtering and time-based filtering can be implemented in any sequence as needed.

At step 206, address information detection is performed to acquire address information from those Web messages containing such address information, and discard other Web messages having no address information contained.

Note that it is not necessary for all Web messages to contain address information, and it is an option for users posting Web messages whether to have their current address information contained. If it is selected by a user to reveal his/her address information, the Web messages posted have address information contained, otherwise, no address information is contained.

Address information is generally in the form of GPS address data, however, with third party services, address information within Web messages may have the form of literal description, such as "XX 街与 YY 街路口 (crossroads of XX street and YY street)". Address information within messages posted by users can be acquired through APIs provided by Web browsers. However, in the case of literally described address information that have been acquired, according to one embodiment of the present invention, it is necessary to convert the literal description into GPS address data, which can be implemented by using converting tools in the prior art, and will not be described in detail herein.

According to another embodiment of the present invention, address information can be extracted from the contents of Web messages, and then converted into GPS address data. For example, given a Web message "现在，崇文门大街到长安街的路口发生了拥堵，车辆行驶缓慢. (a traffic jam is occurring at crossroads of Chongwenmen street and Changan street. Vehicles move slowly.)", address information "崇文门大街到长安街的路口 (crossroads of Chongwenmen street and Changan street)" can be extracted from the message. The address information can be converted to GPS address data in connection with available map information.

At step 208, based on the acquired address information of the Web messages, things in the IoT adjacent to the interested events are detected.

For those skilled in the art, the position of every thing in the IoT (such as, GPS address data) is known, and those things related to the interested events can be determined from the address information of the Web messages and the known position information of things. For example, a thing having a minimal linear distance from an interested event can be determined as an adjacent thing.

However, as described above, due to the mobility of users, it is possible for a user to post a Web message after a period of time since he/she has observed an event and at which time his/her position has been changed. Thus, there may be a difference between the location where a user posted a Web message and the location where the interested event occurred. As a result, it may be difficult to determine those things having relatively higher adjacencies to the interested events only depending upon the address information of one or a few Web messages and the location information of things that have been known.

According to one embodiment of the present invention, it is proposed to employ the existing curve fitting technique to determine those things having relatively higher adjacencies to the interested events from a huge amount of things in the IoT.

According to one embodiment of the present invention, the adjacency detection step may include the following operations:

at a first step: from the acquired Web messages, extracting address information contained in those Web messages that are posed by the same user. For instance, given that total 100 users have posted the related messages, address information is extracted from those Web messages posted in the last 6 hours by one and the same user.

at a second step: for each user, performing curve fitting with the address information contained in the Web messages posted by the user, so as to acquire his/her position curve.

Figure 3:
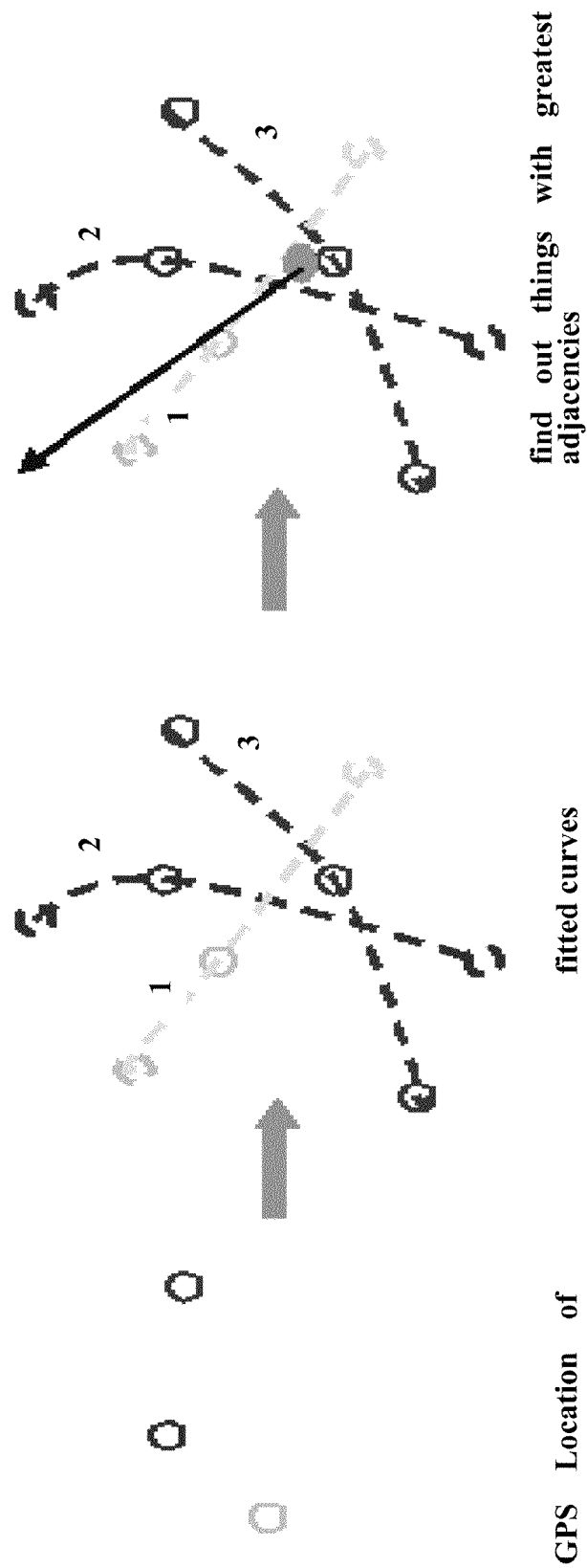
FIG. 3 is a diagram showing curves produced through curve fitting based on the address information of Web messages posted by each user according to embodiment of the present invention.

FIG. 3 is a diagram showing the curves obtained by using curve fitting with the address information contained in the Web messages posted by each user according to one embodiment of the present invention. As shown in FIG. 3, hollow circles indicate the address information of each piece of Web message, and each curve is fitted based on the address information of the Web messages posted by the same user. In FIG. 3, things in the IoT are denoted by solid circles. Although only one thing is shown in FIG. 3, the present invention is not limited thereto, as mentioned previously, the number of things can be much more than that shown, and can be selected by those skilled in the art as needed.

at a third step: based on the distance relationship between the position data of things and each curve, determining a adjacent thing.

The following formula can be used to determine the distance relationship between the position data of things and respective curves:

given each thing denoted as $x_1, x_2, \ldots x_m$ and each curve as $D_1, D_2, \ldots D_N$, $$arg\ min_i(max_j(dis\tan ce(x_i, D_j)))$$

wherein distance$(x_i, D_j)$ denotes the shortest distance from the ith thing to the jth fitted curve, wherein i denotes the ith thing and is an integer from 1 to M, M is the total number of adjacent things selected based on user requirements; j denotes the jth fitted curve and is an integer from 1 to N, N is the total number of the curves obtained through curve fitting; Max denotes a function that returns a maximum value, Min denotes a function that returns a minimal value.

With the above formula, the largest one of the distances between a thing and each curve is selected as a characterized distance for that thing, and then a thing with the minimal characterized distance of all of the things is selected as the closest thing for the interested event. Furthermore, corresponding things can be sorted in an ascending order of the characterized distances to denote the adjacencies to the interested event for each thing.

For example, taking FIG. 3 as an example again, as the result of the curve fitting, two curves 1 and 2 are fitted based on the address information of user A, and a curve 3 is fitted based on the address information of user B. Assume that there are more than one things existed, and the largest one of the distances from each thing to the three curves is 5, 3, 5, 6, 9, 8, . . . , respectively. Then, a thing with a minimum 3 of those largest distances is selected as the closest thing as shown in FIG. 3.

The most beneficial aspect of such method lies in that arg $min_i(max_j(dis\tan ce(x_i, D_j)))$ is simple and has been standardized in the prior art, with many implementation tools that are easily available.

Needless to say the present invention is not limited thereto, and other distance formulas can be used by those skilled in the art as needed. For example, least average distance can be employed, in which the average value of the distances between a thing and respective curves is considered as the characterized distance, and a thing with the shortest characterized distance is selected as the closest thing. The least square value of maximum distances can be used as well, in which the square of a maximum distance among the distances to respective curves is selected as a characterized distance for each thing, and a thing with the minimal characterized distance is considered as the closest thing.

At step 210, original data of the determined adjacent things is tagged with at least part of the Web messages.

For example, given that a user has posted a Web message "看到了四作追尾,太惨了!(a rear-end collision with four cars, so miserable!)" at 7:56 AM on Sep. 23, 2011, and a camera mounted on the west end of Xinjiekou street is the closest camera, the word "追尾 (rear-end collision)" and the time "2011/9/23" in the Web message can be used as metadata to tag an original data file vsd.vso obtained from the camera mounted on the west end of Xinjiekou street.

Furthermore, every adjacent camera can be sorted, for example, to generate a Web page containing the following content:

rear-end collision 011/9/23 7:56 west end of Xinjiekou street vsd.vso east end of Xinjiekouxijie street vsf.vso west end of Xinjiekouxijie street vsg.vso Users can click on corresponding video files to watch them. Also, data can be retrieved by natural language query like "rear-end collision" or "2011/9/23", etc.

At step 212, the process 200 ends.

As described above, Web messages data is growing by exponential order. For each implementation of the process 200, it is time consumed and has relatively large computing cost if all of Web messages in the network are processed from step 204.

According to one embodiment of the present invention, a pretreatment step can be inserted between step 202 and step 204, in which all of the Web messages posted on the network can be indexed in real time with present index techniques, and then those Web messages having contents related to interested events are extracted based on the index at step 204.

For instance, every Web message can subject to real-time word segmentation with word segmentation techniques, and it is determined whether at least one keyword is presented in the Web message according to a pre-established keyword database, and then an index is constructed through linking the Web message in which a certain keyword is present to that keyword in the keyword database.

Taking the Web message "rear-end collision of cars" as an example again, the message is word-segmented to "rear-end collision of/cars". Using "car" and "rear-end collision" as index words, a reversed list is constructed, by which the Web message can be retrieved through searching "car" or "rear-end collision".

Then, at step 204 Web messages related to the keywords are rapidly extracted for a further process by using the links.

Furthermore, although every step is indicated with an arrow line in FIG. 2, the present invention is not limited thereto, and every step in FIG. 2 can be executed in other sequences. For example, steps 204 and 206 can be executed in a reversed sequence.

Figure 4:
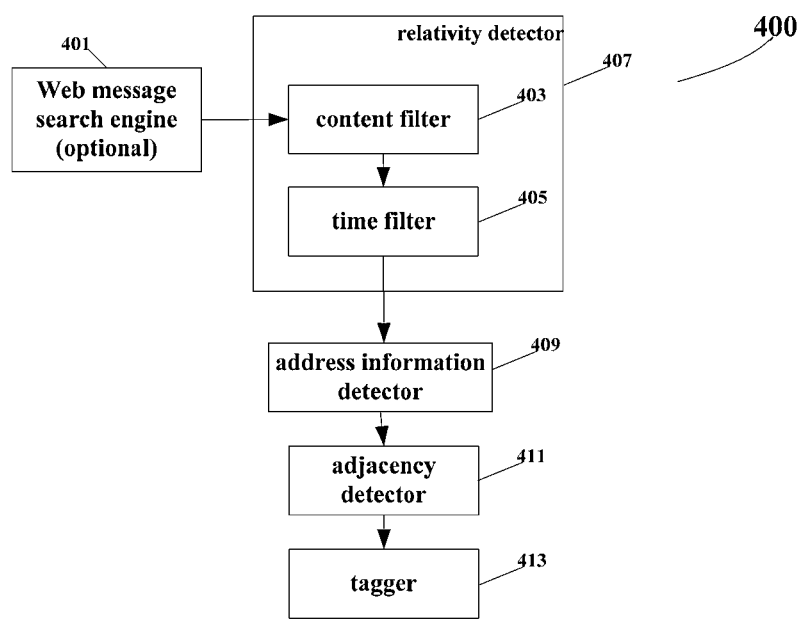
FIG. 4 is a block view showing a system for tagging original data generated by things in IoT according to one embodiment of the present invention.

FIG. 4 is a block diagram showing a system 400 for tagging original data generated by things in the IoT according to one embodiment of the present invention.

The system 400 according to one embodiment of the present invention includes a Web message search engine 401, a relativity detector 407, an address information detector 409, a adjacency detector 411 and a tagger 413. The relativity detector 407 includes a content filter 403 and a time filter 405.

The Web message search engine 401 is optional, which is not necessarily required in the implementation of the present invention. The Web message search engine 401 is used to index all of the Web messages posted on the network in real time.

The relativity detector 407 is used to detect those Web messages related to various events. The content filter 403 is used to filter those Web messages having contents related to various events. The time filter 405 is used to filter those Web messages posted at a time in a specified range of time from the occurrence time of the various events and performs the recency so as to acquire those web messages describing recent situations and being posted within the specified range of time. Other messages are discarded.

The address information detector 409 receives the related Web messages from the relativity detector 407, and then extracts address information contained in those Web messages. The address information can be extracted from those Web messages through APIs, or can be filtered from the contents of the Web messages. The address information may have the format of GPS data or text data. The address information detector 409 may include a converter (not shown) for converting the address information from, for example, text to GPS data.

The adjacency detector 411 is used to determine those things closest to the events occurred based on the address information from the address information detector 409. A specific implementation has been described above, and will not be repeated herein.

The tagger 413 is used to tag original data of the closest things determined based on corresponding Web messages.

According to one embodiment of the present invention, tagged results can be posted in the form of Web page, document, text, etc for a further process. For example, the tagged results can be used by a search engine for its search in order to rapidly provide associated query results to users querying in natural language.

Figure 5:
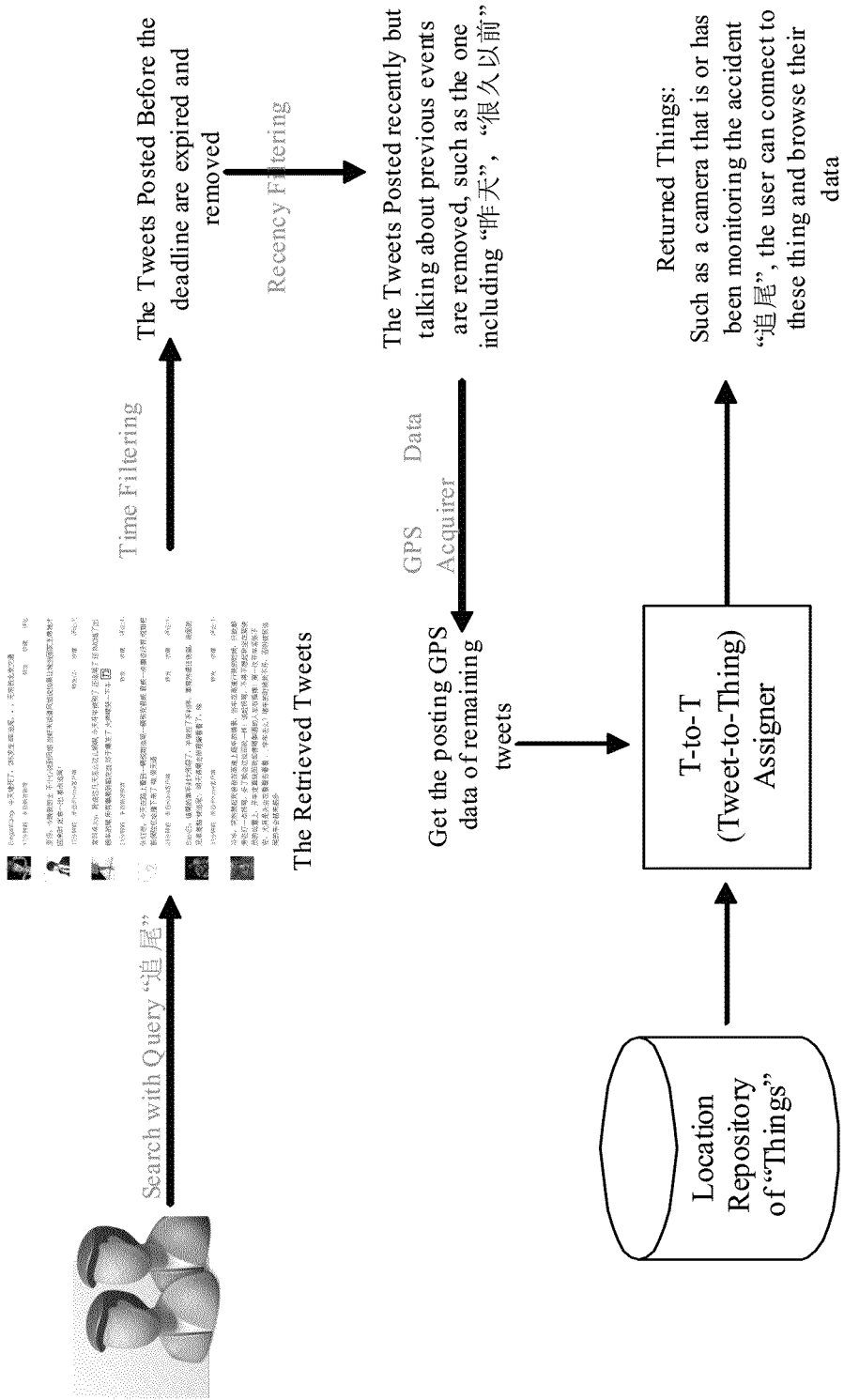
FIG. 5 is a flowchart showing a search processing example according to one embodiment of the present invention.

FIG. 5 is a flowchart showing an exemplary search process according to one embodiment of the present invention. FIG. 5 shows a query application of the present invention.

As shown in FIG. 5, a user can query rear-collision accidents occurred with "'追尾 (rear-end collision)". The content filter 403 finds out Web pages linked with the keyword "'追尾 (rear-end collision)" and provides Web pages having contents related to the query condition of the user. The time filter 405 filters out all Web messages beyond the specified range of time, and processes the remaining Web messages. The time filter 405 further performs recency filtering based on the contents of the Web messages to filter out those Web messages unrelated to the current events. For example, the user needs contents related to those rear-collision accidents occurred today, consequently, Web messages containing "rear-end collision . . . yesterday" or "rear-end collision . . . a long time ago" are not concerned and will be removed.

The address information detector 409 acquires from the remaining Web messages the address information contained therein. As described above, the position information of things in the IoT is known and stored in a database in advance. The adjacency detector 411 detects those things related to the interested events. The tagger 413 tags each things with at least a part of the Web messages to indicate the semantics of original data obtained by respective things. With the tags described above, queries in natural language can be associated with original data for providing users with something like "returned query results: cameras monitoring or having monitored "rear-end collision", users can connect to those cameras and browse their data."

Needless to say, users can perform original date association mining based on those tags. For example, it is possible to find out all cameras related to a rear collision accident so as to acquire data associated with the occurrence process of the rear collision accident.

Figure 6:
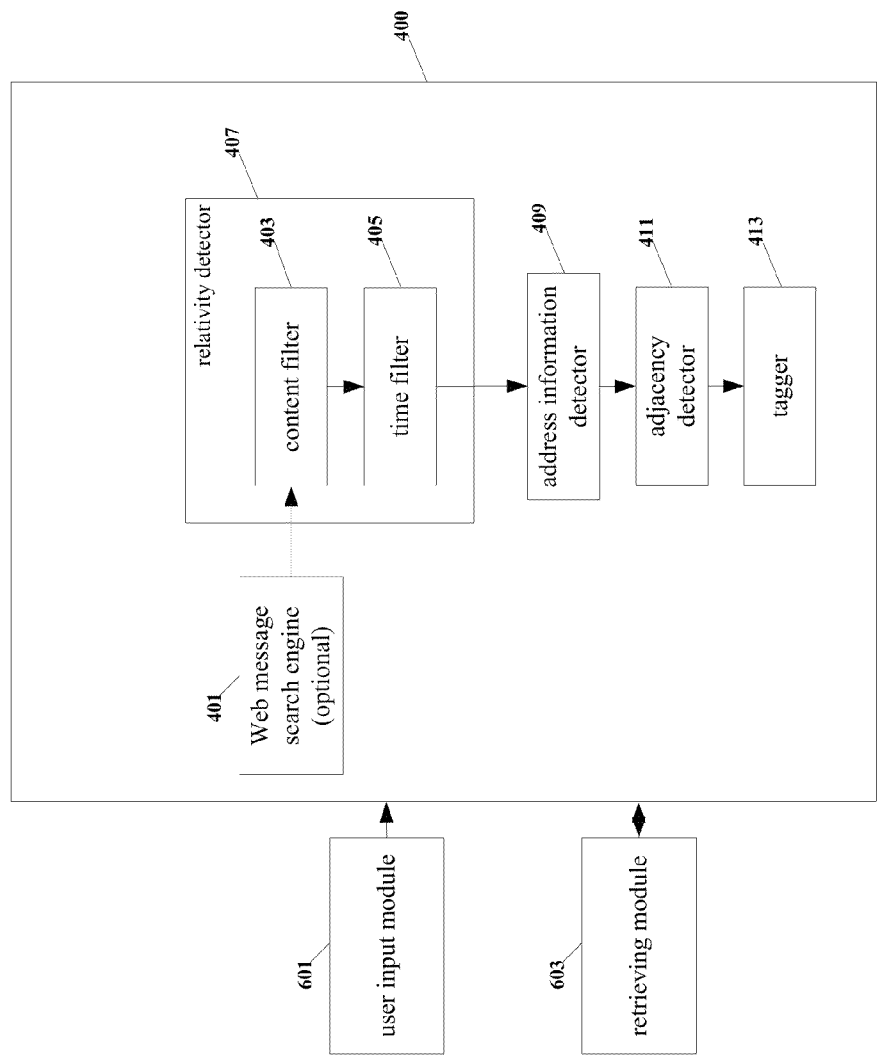
FIG. 6 is a block view showing a search engine according to one embodiment of the present invention.

FIG. 6 is a block diagram of a search engine according to one embodiment of the present invention. FIG. 6 shows a specific example of one implementation of the present invention.

As shown in FIG. 6, the search engine includes the system 400 as illustrated in FIG. 4. Furthermore, the search engine includes a module 601 for receiving a user input and a module 602 for retrieving based on the user input and information generated by the system 400. Then, retrieved results are returned to the querying users.

The principle concept of the present invention has been described above, those skilled in the art will appreciate that the present invention may provide one or more of the following advantages:

to provide understandable IoT with the connection of Web messages and the IoT
  assigning Web messages to related "things";
  enriching the observation of things with metadata;
  utilizing natural language other than quantitative data, images, videos, etc;
  conveying sentimental opinions other than neutral data; and
  reflecting different viewpoints of different individual.
to enrich "things" with Web messages
  identifying relationships between instant microblog posts and "things";
  assigning posts as tags to "things";
  supporting search and mining functions on things;
  user being capable of searching in natural language; and
  retrieving related microblog posts;

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer usable or readable medium(s) may be utilized. The computer usable or readable medium may be a computer readable signal medium or a computer readable storage medium. A computer readable storage medium may be, for example, but not limited to, an electronic, magnetic, optical, electromagnetic, infrared, or semiconductor system, apparatus, or device, or transporting medium.

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this manner, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The corresponding structures, materials, acts, and equivalents of all means or steps plus function elements in the claims are intended to include any structure, material, or act for performing the function in combination with other claimed elements as specifically claimed. The description of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable those of ordinary skill in the art to understand the present invention for various embodiments with various modifications as are suited to the particular use contemplated.

What is claimed is:

1. A method for tagging original data generated by things in the Internet of Things (IoT), comprising:
   identifying, by a computer, based on keyword searching, one or more social media messages on a network server related to an event of interest;
   filtering, by the computer, the identified one or more social media messages based on a message posting time occurring in a predefined time interval about the event of interest;
   filtering, by the computer, the time filtered social media messages based on message content describing an event that is occurring or has just occurred;
   extracting, by the computer, physical location information contained in the occurring-just-occurred filtered social media messages;
   identifying, by the computer, data generating devices that are within a predefined distance of the event of interest based on the extracted physical location information and the data generating devices' known locations; and
   tagging, by the computer, original data generated by the identified data generating devices with semantic metadata based on the predefined time interval about the event of interest and the content of the occurring-just-occurred filtered social media messages.

2. The method according to claim 1, wherein the step of identifying data generating devices that are within a predefined distance of the event of interest comprises:
   determining a physical location curve for each user posting an occurring-just-occurred filtered social media message based on the extracted physical location information; and
   identifying data generating devices having a minimal distance value to the physical location curves.

3. The method according to claim 2, wherein the minimal distance value is determined according to one or more of: the minimal value of the distances between the locations of the data generating devices and the physical location curves; the minimal value of the maximum distances between the locations of the data generating devices and the physical location curves; the minimal value of the average distances between the locations of the data generating devices and the physical location curves; and the minimal value of the squared maximum distances between the locations of the data generating devices and the physical location curves.

4. A computer program product for tagging original data generated by things in the Internet of Things, comprising:
   one or more non-transitory computer-readable storage media and program instructions stored on the one or more non-transitory computer-readable storage media, the program instructions comprising:
   program instructions to identify, by a computer, based on keyword searching, one or more social media messages on a network server related to an event of interest;
   program instructions to filter, by the computer, the identified one or more social media messages based on a message posting time occurring in a predefined time interval about the event of interest;
   program instructions to filter, by the computer, the time filtered social media messages based on message content describing an event that is occurring or has just occurred;
   program instructions to extract, by the computer, physical location information contained in the occurring-just-occurred filtered social media messages;
   program instructions to identify, by the computer, data generating devices that are within a predefined distance of the event of interest based on the extracted physical location information and the data generating devices' known locations; and
   program instructions to tag, by the computer, original data generated by the identified data generating devices with semantic metadata based on the predefined time interval about the event of interest and the content of the occurring-just-occurred filtered social media messages.

5. The computer program product according to claim 4, wherein the program instructions to identify data generating devices that are within a predefined distance of the event of interest comprises:
   program instructions to determine a physical location curve for each user posting an occurring-just-occurred filtered social media message based on the extracted physical location information; and
   program instructions to identify data generating devices having a minimal distance value to the physical location curves.

6. The computer program product according to claim 5, wherein the minimal distance value is determined according to one or more of: the minimal value of the distances between the locations of the data generating devices and the physical location curves; the minimal value of the maximum distances between the locations of the data generating devices and the physical location curves; the minimal value of the average distances between the locations of the data generating devices and the physical location curves; and the minimal value of the squared maximum distances between the locations of the data generating devices and the physical location curves.

7. A computer system for tagging original data generated by things in the Internet of Things, comprising:
one or more computer processors, one or more non-transitory computer-readable storage media, and program instructions stored on one or more of the non-transitory computer-readable storage media for execution by at least one of the one or more processors, the program instructions comprising:
program instructions to identify, by a computer, based on keyword searching, one or more social media messages on a network server related to an event of interest;
program instructions to filter, by the computer, the identified one or more social media messages based on a message posting time occurring in a predefined time interval about the event of interest;
program instructions to filter, by the computer, the time filtered social media messages based on message content describing an event that is occurring or has just occurred;
program instructions to extract, by the computer, physical location information contained in the occurring-just-occurred filtered social media messages;
program instructions to identify, by the computer, data generating devices that are within a predefined distance of the event of interest based on the extracted physical location information and the data generating devices' known locations; and
program instructions to tag, by the computer, original data generated by the identified data generating devices with semantic metadata based on the predefined time interval about the event of interest and the content of the occurring-just-occurred filtered social media messages.

8. The computer system according to claim 7, wherein the program instructions to identify data generating devices that are within a predefined distance of the event of interest comprises:
program instructions to determine a physical location curve for each user posting an occurring-just-occurred filtered social media message based on the extracted physical location information; and
program instructions to identify data generating devices having a minimal distance value to the physical location curves.

9. The computer system according to claim 8, wherein the minimal distance value is determined according to one or more of: the minimal value of the distances between the locations of the data generating devices and the physical location curves; the minimal value of the maximum distances between the locations of the data generating devices and the physical location curves; the minimal value of the average distances between the locations of the data generating devices and the physical location curves; and the minimal value of the squared maximum distances between the locations of the data generating devices and the physical location curves.

* * * * *